June 19, 1956 C. L. PENROD ET AL 2,750,931
POWER UNIT
Filed Dec. 10, 1951 4 Sheets-Sheet 1

Creo L. Penrod
Gertrude A. Penrod
INVENTORS

BY *Clarence A. O'Brien*
*and Harvey B. Jackson*
Attorneys

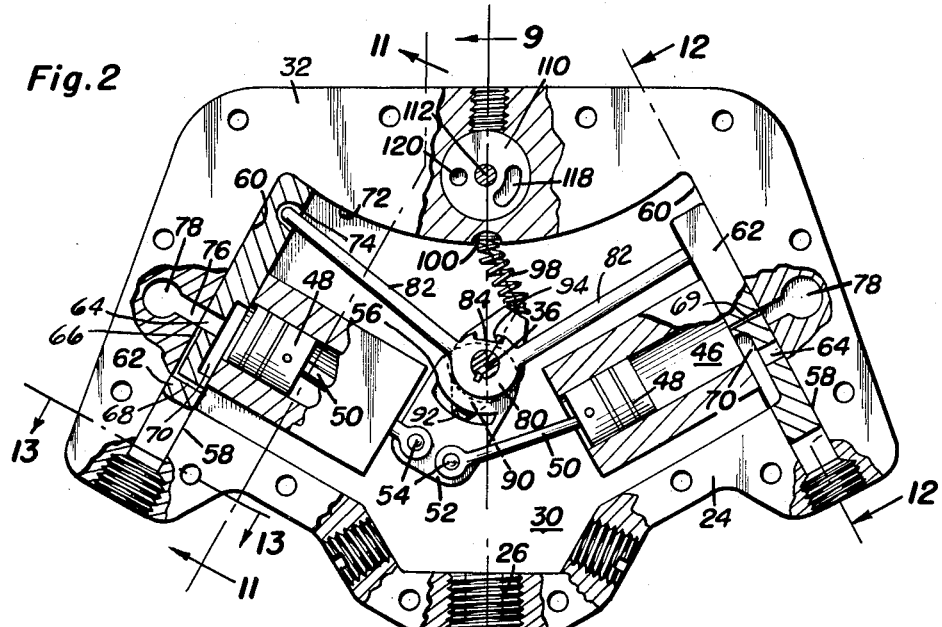
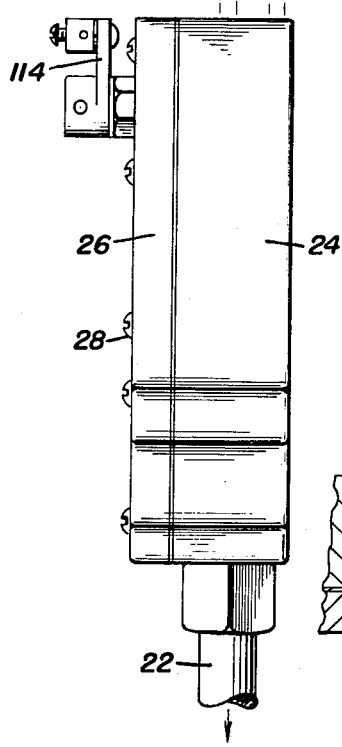
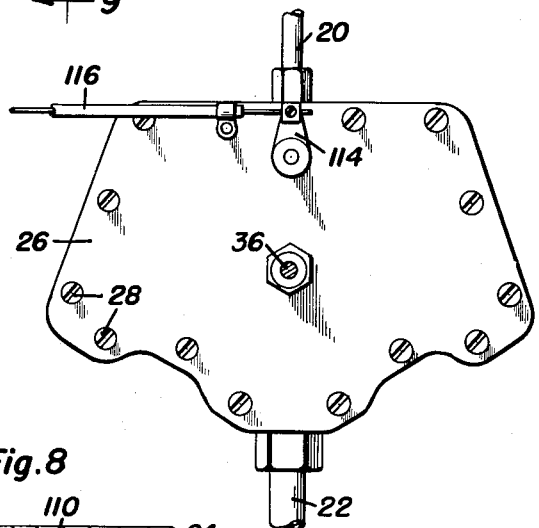
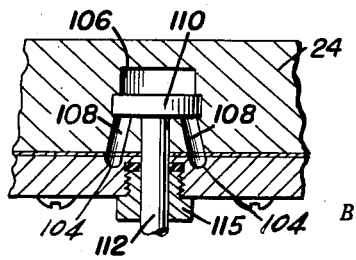
Creo L. Penrod
Gertrude A. Penrod
INVENTORS

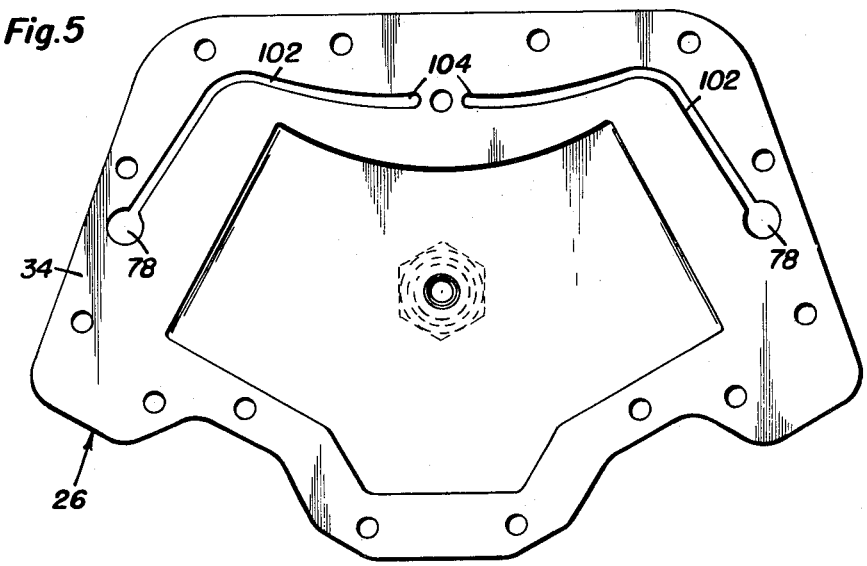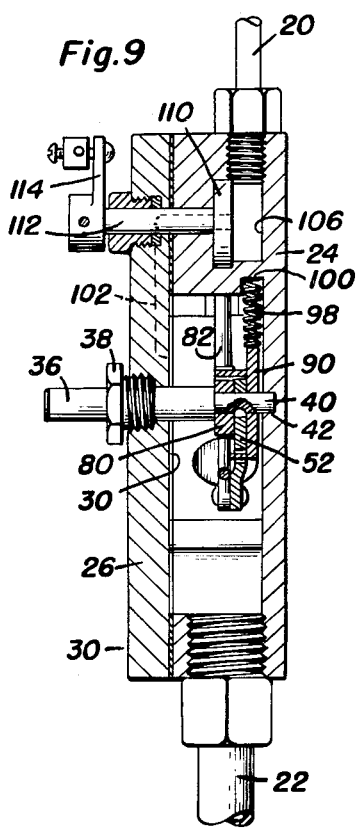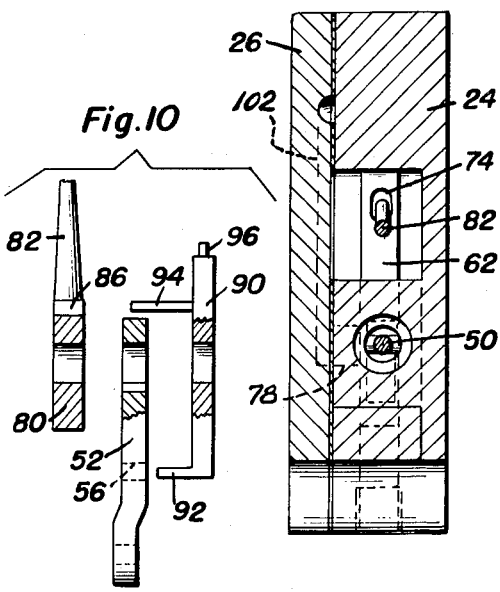

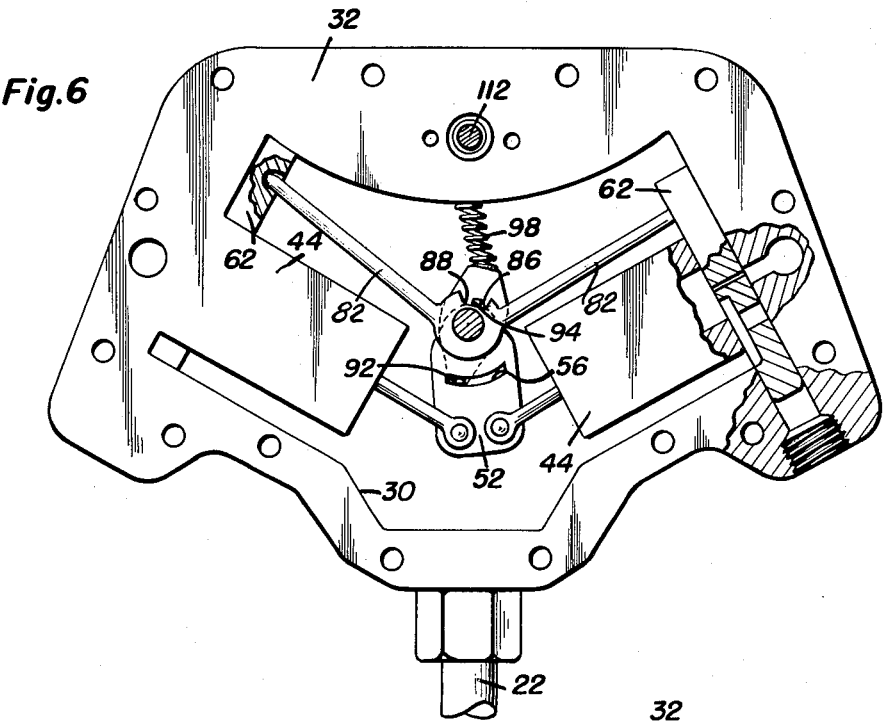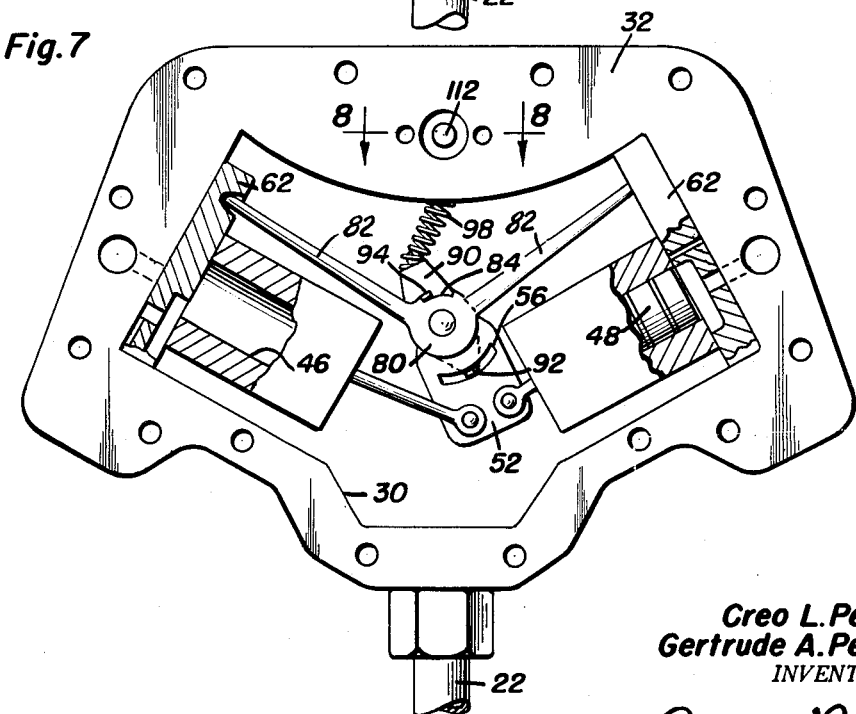

2,750,931
Patented June 19, 1956

2,750,931
POWER UNIT

Creo L. Penrod and Gertrude A. Penrod,
South Bend, Ind.

Application December 10, 1951, Serial No. 260,880

5 Claims. (Cl. 121—120)

This invention comprises novel and useful improvements in a power unit and more specifically relates to a fluid pressure motor of the type specifically adapted to operate windshield wipers of motor vehicles, and which is designed to use a fluid pressure produced by the engine during its operation such as the pressure fluids of the engine pressure lubricating system, the water cooling system or the like.

The primary object of this invention is to provide a compact hydraulic pressure operated motor specifically adapted for use with automobile windshield wipers and which shall be positive in its operation, will be uneffected by variations in the intake manifold suction of the engine, and which will not constitute a serious drain upon the engine generated fluid pressure source utilized to drive the motor.

A further object of the invention is to provide a fluid pressure operated motor wherein the motor fluid may be selectively supplied to the valve mechanism of the motor or selectively vented to the fluid discharge conduit of the motor.

Yet another object of the invention is to provide an improved mechanism for causing a snap or trip action of the valve mechanism controlling the distribution of the pressure fluid to the cylinders of the motor.

These, together with various ancillary objects and features of the invention, which will later become apparent as the following description proceeds, are attained by the present invention, a preferred embodiment of which has been illustrated, by way of example only, in the accompanying drawings, wherein:

Figure 2 is in a plan view of the block portion of the casing of the device, parts being broken away and showing the hydraulic operative pistons, power shaft, valve mechanism and operating means therefor;

Figure 3 is a front elevational view of the hydraulic motor with its cover applied thereto;

Figure 4 is an end elevational view of the motor of Figure 3, taken from the right end thereof;

Figure 5 is a plan view of the cover of the motor and showing the passage means formed therein for conducting hydraulic fluid to the valve mechanism;

Figure 6 is a view similar to Figure 2 but showing the parts in an intermediate position;

Figure 7 is a view similar to Figure 6 but showing the parts in the other extreme position during their operations;

Figure 8 is a detailed sectional view taken substantially upon the plane indicated by the horizontal section line 8—8 of Figure 7 and showing the arrangement of the manually operated control valve of the invention;

Figure 9 is a vertical central sectional view taken substantially upon the plane indicated by the section line 9—9 of Figure 2;

Figure 10 is an exploded group perspective view of the crank arm, the trigger and the valve actuating sleeve forming elements of this invention;

Figure 11 is a sectional view taken substantially upon the plane indicated by the section line 11—11 of Figure 2;

Figure 1:
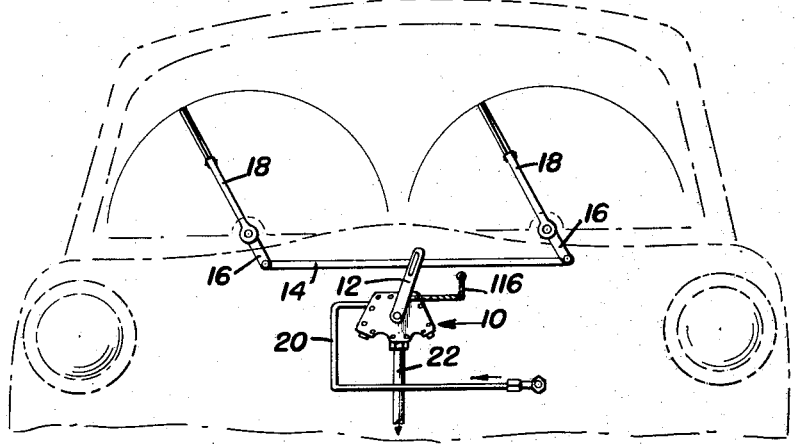
Figure 1 is a front elevational view, partly diagrammatic, of a portion of an automobile having a pair of windshield wipers and illustrating the hydraulic motor in accordance with the principles of the present invention applied thereto for operating the wipers from any suitable fluid pressure source of the vehicle internal combustion engine.
Figure 13:
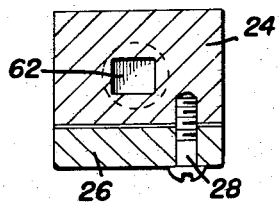
Figure 13 is a further detailed view taken substantially upon the plane indicated by the section line 13—13 of Figure 2.
Figure 12:
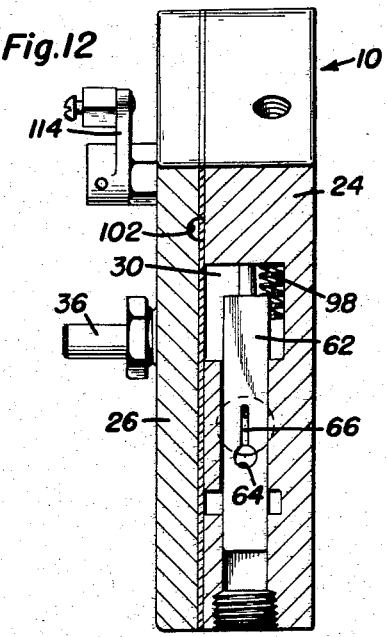
Figure 12 is a further sectional detail view taken substantially upon the plane indicated by the section line 12—12 of Figure 2.

Reference is now made more specifically to the accompanying drawings, wherein like numerals designate similar parts throughout the various views. Referring first to Figure 1, it will be seen that the numeral 10 designates generally the improved hydraulic motor forming the subject of this invention, which is shown as being mounted upon a portion of an automotive vehicle for driving an oscillating lever 12 connected with a tie rod 14 whose ends are pivoted to the actuating cranks 16 of a pair of windshield wipers 18. A conduit 20 is shown connected to the fluid motor 10 for supplying the same with fluid pressure from any suitable source, while a fluid discharge conduit 22 is likewise connected to the motor for returning the fluid exhausted from the motor to the source of supply. The motive fluid for this motor, referred to hereinafter as the pressure fluid, the hydraulic actuating fluid, and the like, may obviously be of any desired type. However, when the hydraulic motor is utilized to operate the windshield wipers of an automobile, it is preferred to utilize as the motive fluid a fluid medium forming part of one of the engine operated fluid systems such as the lubricating system, the cooling water system of the engine, or any other system where a fluid is mainatined under pressure.

The fluid motor 10 includes a casing which is preferably composed of a block 24 and a cover member 26, these elements being preferably die cast from suitable material and removably secured together upon adjacent plane surfaces by means of removable fastening bolts 28 as shown in Figures 3 and 4.

As shown more clearly in Figures 2, 6 and 7, the casing 24 is provided with a chamber 30 into the lower portion of which is screw threaded the discharge line 22 for the exhausted motive fluid. This chamber 30 opens into the plane surface 32 of the block 24 which is complementary to and engaged by the corresponding plane surface 34, see Figure 5, of the cover 26.

The power shaft of the hydraulic motor, is indicated by the numeral 36, and as shown in Figure 9 extends through the cover 26, it being journalled in a screw threaded bushing 38, and passing across the chamber 30 has its diametrically reduced end portion 40 seated in a bearing recess 42 in the wall of the chamber 30 of the body portion 24, opposite the cover. The shaft 36 constitutes the drive shaft of the motor, and is given an oscillatory motion as set forth hereinafter, this shaft being suitably connected to the oscillating crank arm 12 previously mentioned, whereby the windshield wipers are actuated by the motor.

As shown in Figure 6, the block 24 has a pair of integral portions 44 which project into the chamber 30, and which as shown in Figures 2 and 7 are provided with bores 46 comprising the power cylinders of the motor. These bores are disposed at an angle or in V-formation with respect to each other, and have their inner ends opening into the chamber 30 as shown in Figure 2.

A pair of pistons 48 are slidingly received in the cylinder bores 46 and are provided with connecting rods 50 extending into the casing 30 which thus functions as a crank casing.

A crank arm which may conveniently comprise a flat plate-like member 52, see Figures 9 and 10, is disposed in the crank casing chamber 30 and is keyed or otherwise fixedly secured to the motor shaft 36. The ends of the connecting rods 50 are pivotally connected to the outer end portion of the crank arm 52 as by pivot pins 54, and it will be observed that the crank shaft has its axis positioned between and slightly above the junction of the center lines of the two cylinders 46, as viewed in Figure 2, whereby the connecting rods and pistons are disposed on opposite sides of the crank arm and shaft.

It will be observed that the crank arm 52 is provided with a slot 56 which is concentric with the axis of the shaft 36, and is disposed between the connecting rod pins 54 and the shaft 36, this arcuate slot being utilized in the operation of the slide valve actuator 90, as subsequently set forth.

Figure 14:
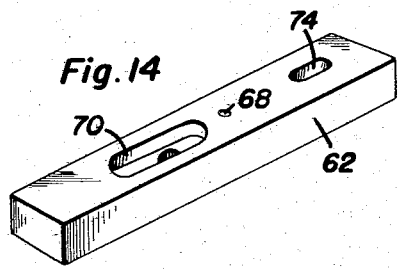
Figure 14 is a perspective view of one of the sliding valves, taken of the face of the valve which is adjacent to the cylinder.
Figure 15:
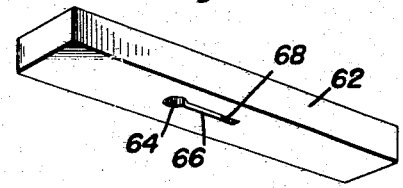
Figure 15 is a perspective view of the other face of the slide valve.

The block 24 is provided with a pair of slots 58 which are disposed transversely of the cylinders 46, extend along inclined side walls 60 of the chamber 30, and open through the lower sides of the chamber as shown in Figure 2. These slots constitute slideways for the reception of slide valve members 62 whose construction is best shown in Figures 14 and 15. Each valve is in the form of an elongated flat plate and each is provided with a fluid pressure inlet port 64. One of the valves is provided, upon its face which is adjacent to the side wall 60 of the chamber 30, with a longitudinal groove 66 terminating in a bore 68 and the other valve is provided with a bore 69. Upon the other face of each valve, that is upon that face adjacent the cylinder bore, is provided a longitudinally extending recess or slot 70 communicating with the passage 64. This slot provides an exhaust or discharge passage when the valve plates are in the position illustrated by the right hand valve in Figure 2. Additionally, that portion of each valve which is nearest to the convexly curved upper or top wall 72 of the chamber is provided with a recess 74 for the reception of a valve operating mechanism as set forth hereinafter. Thus, it will be seen that the left hand valve shown in Figure 2 is so constructed, by means of port 64, groove 66, bore 68 and slot 70, that the left hand cylinder will be vented in any position of the valve. On the other hand, the right hand cylinder will be vented only when the valve is in the exhaust position. This, as will be presently apparent, will permit parking of the wiper blade.

Within the body 24 there is provided a bore 76 with which the valve inlet bore 64 is adapted to register when the valve is at one extreme of its travel, this bore in turn communicating with a port 78 opening upon the face 32 of the body 24.

Reference is now made more particularly to Figures 2, 6, 7, 9 and 10 for an understanding of the mechanism for imparting snap actuation to the valves 62. A sleeve or collar 80 is rotatably received upon the reduced portion 40 of the shaft 36. A pair of valve actuating arms 82 are integrally or rigidly secured to the sleeve and extend therefrom at an obtuse angle. Between these arms, the sleeve 80 is provided with a circumferentially extending peripheral notch 84 which at its opposite ends is provided with a pair of stop or abutment surfaces 86 and 88. The outer ends of these arms are loosely received in the recesses 74 in the valve member 62. As so far described, it will now be apparent that upon oscillation of the collar or sleeve 80 in a manner to be subsequently set forth, the valve member 62 will be operated in alternation in opposite directions, as will be apparent from an inspection of Figures 2, 6 and 7.

A trigger mechanism is provided for imparting a snap actuation or oscillatory motion to the sleeve 80. This trigger mechanism includes a plate 90 which is apertured for journalling upon the portion 40 of the shaft 36, one end of this trigger having a laterally projecting lug or finger 92 which is receivable in the above mentioned aperture 56 of the member 52, and is provided with an actuating arm or finger 94 parallel to the lug 92 but considerably longer than the same, which actuating finger 94 extends into the notch 84 for oscillatory movement therein and for alternate engagement with the abutment surfaces 86 and 88 thereof.

Upon its upper end, the member 90 is provided with an upstanding pin 96 which is adapted to constitute a retaining means for one end of a compression spring 98, the other end of this spring being seated upon a similar pin, not shown, disposed in a recess 100 in the curved wall 72 of the chamber 30. The arrangement of this spring is such that when the spring is disposed upon a straight line between the recess 100 and the axis of the shaft 36, the spring and the mechanism associated therewith is in unstable equilibrium so that a slight shifting of the mechanism from this center line will cause the spring to urge the mechanism to one extereme of its oscillatory path of travel.

From the foregoing, it is believed that the valve actuating mechanism will now be readily understood. With the parts in the position shown in Figure 2, it is assumed that the right hand piston 48 has completed its working stroke, and that the left hand piston 48 is beginning to receive pressure fluid through the members 78, 76 and the inlet port of the piston. Accordingly, the left hand piston 48 drives the member 48 in a counter clockwise direction about the shaft 36, as the left hand piston moves upon its working stroke, at the same time pushing the right hand piston upwardly in its cylinder. During the first part of this travel, the finger 92 and the trigger 90 remain stationary, as the arcuate slot 56 rides across the finger 92 during this oscillation of the member 52. This motion continues until the finger is engaged by the left hand end of the slot 56, whereupon further outward movement of the piston 48, which is now near the end of its working stroke, begins to move the member 90 with the member 52 through the engagement of the finger 92 in the end of the slot 56. As the trigger moves in a counter clockwise direction, its actuating finger 94 travels across the arcuate slot 84 until it engages the abutment surface 88 at the left hand side of the notch. This engagement occurs at substantially the end of the stroke of the piston 48, whereby the final movement of the piston stroke will cause counter-clockwise rotation of the sleeve 80 about the shaft 36, until the spring is moved from its dead center position, whereupon the entire valve mechanism moves with a snap motion from the position shown in Figure 2 toward the position shown in Figure 7. This snap actuation of the valve mechanism moves the valve of the left hand cylinder away from its pressure fluid supplying position, and opens the right hand valve mechanism from the closed position shown in Figure 2 to the open position shown in Figure 7.

In Figure 6 the valve mechanism is disclosed in the intermediate position above described during which the outwardly moving left hand piston 48 has pivoted the member 52 until the end of the slot 56 rests against the finger 92 of the trigger, and the initial movement of the trigger 90 has moved the actuating finger 94 to about the mid-portion of the slot or notch 84.

A fluid pressure actuating medium is supplied to the cylinders of the motor by means of the above mentioned passages 78 and 76. The ports 78 for the two cylinders, as shown best in Figure 5, are provided with L-shaped conduits or channels 102, disposed in the face 34 of the cover 26 which have their adjacent end portions 104 closely spaced.

As will be seen by reference to Figures 2, 8 and 9, the block 24 is provided with a cylindrical valve chamber 106 from which extend a pair of ports 108 opening upon the outer surface 32 of the block 24 and which register with the ends 104 of the conduits 102. By this means, the conduits are in communication with the chamber 106.

A valve disc 110 is seated in the chamber 106 and positioned to overly the adjacent ends of the ports 108, this disc having a valve actuating stem 112 which extends through a suitable valve stem packing bushing 115, and upon the exterior of the motor is provided a valve actuating lever 114 controlled by a conventional Bowden wire control indicated generally by the numeral 116 which is of a known and conventional design.

By reference to Figure 2, it will be seen that the valve disc 110 is provided with an arcuate port 118 which always registers with one of the ports 108 and therefore is the parking port, and a circumferentially spaced circular port 120 which registers with the other port 108 for operating the motor. The arrangement is such that the valve may be turned into a position whereby the ports 118 and 120 will connect the two ports 108 with the interior of the chamber 106 whereby pressure fluid may be supplied to both of the passages or conduits 102 whereby the two cylinders may be actuated by the automatic valve mechanism previously described. Alternatively however, the valve may be turned to such a position that only the port 118 registers with one of the ports 108 whereby the fluid pressure will force the corresponding piston downwardly to properly position the wiper blades with respect to the windshield, that is, in the inoperative position. Since only a single one of the passages 102 will be thus communicated with the pressure chamber 106, this position of the wiper blades will be maintained until such time as both passages 102 are pressured-connected by moving the valve so that arcuate port 118 and port 120 register with both of the ports 108.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A hydraulic motor comprising a casing, an oscillatory power shaft journaled in said casing and having a crank arm, cylinders on opposite sides of said shaft, pistons in said cylinders connected to said crank arm, passages supplying hydraulic fluid to said cylinders, a separate valve controlling flow of fluid to and from each cylinder, actuating means connected to said crank arm and connected to said valves for operating the valves in reverse directions upon oscillation of said shaft, means for supplying hydraulic fluid under pressure to said passages, said valves including means for discharging fluid from said cylinders into said casing, means for educting fluid from said casing, said casing having slots disposed transversely of said cylinders, said valves comprising members slidable in said slots, an inlet port in each member registerable with said fluid supply means, a discharge passage in each member communicating with said inlet port and operable to selectively connect the associated cylinder with the fluid supply means or to the fluid educting means.

2. The combination of claim 1, wherein said actuating means includes a member rotatably journaled on said shaft, angularly disposed actuating arms on said member, said valves having recesses receiving the free ends of said actuating arm, a lost motion driving connection between said shaft and said member.

3. The combination of claim 1 wherein said actuating means includes a member rotatably journalled on said shaft, angularly disposed actuating arms on said member, said valves having recesses receiving the free ends of said actuating arm, a lost motion driving connection between said shaft and said member, said lost motion connection including a trigger pivoted on said shaft, said member having spaced abutments, said trigger having a finger movable between and engageable with said abutments, means operatively connecting said trigger to said crank arm.

4. The combination of claim 1 wherein said actuating means includes a member rotatably journalled on said shaft, angularly disposed actuating arms on said member, said valves having recesses receiving the free ends of said actuating arm, a lost motion driving connection between said shaft and said member, said lost motion connection including a trigger pivoted on said shaft, said member having spaced abutments, said trigger having a finger movable between and engageable with said abutments, means operatively connecting said trigger to said crank arm, said last means comprising a slot in said crank arm, a projection on said trigger slidable in said slot.

5. The combination of claim 1 wherein said actuating means includes a member rotatably journalled on said shaft, angularly disposed actuating arms on said member, said valves having recesses receiving the free ends of said actuating arms, a lost motion driving connection between said shaft and said member, said lost motion connection including a trigger pivoted on said shaft, said member having spaced abutments, said trigger having a finger movable between and engageable with said abutments, means operatively connecting said trigger to said crank arm, resilient means urging said trigger to each extreme of its travel.

References Cited in the file of this patent

UNITED STATES PATENTS

| Number | Name | Date |
|---|---|---|
| 426,421 | Tidwell | Apr. 22, 1890 |
| 463,758 | Lemon | Nov. 24, 1891 |
| 528,461 | Browne et al. | Oct. 30, 1894 |
| 1,212,998 | Peck | Jan. 16, 1917 |
| 1,528,836 | McElvaney | Mar. 10, 1925 |
| 1,731,048 | Holmes et al. | Oct. 8, 1929 |
| 1,774,376 | Hueber et al. | Aug. 26, 1930 |
| 1,981,840 | Hueber et al. | Nov. 20, 1934 |
| 2,156,116 | Howard | Apr. 25, 1939 |
| 2,257,534 | Renwick | Sept. 30, 1941 |
| 2,436,462 | Utter et al. | Feb. 24, 1948 |
| 2,450,653 | Galley et al. | Oct. 5, 1948 |
| 2,451,449 | Sacchini | Oct. 12, 1948 |